Figure 1:
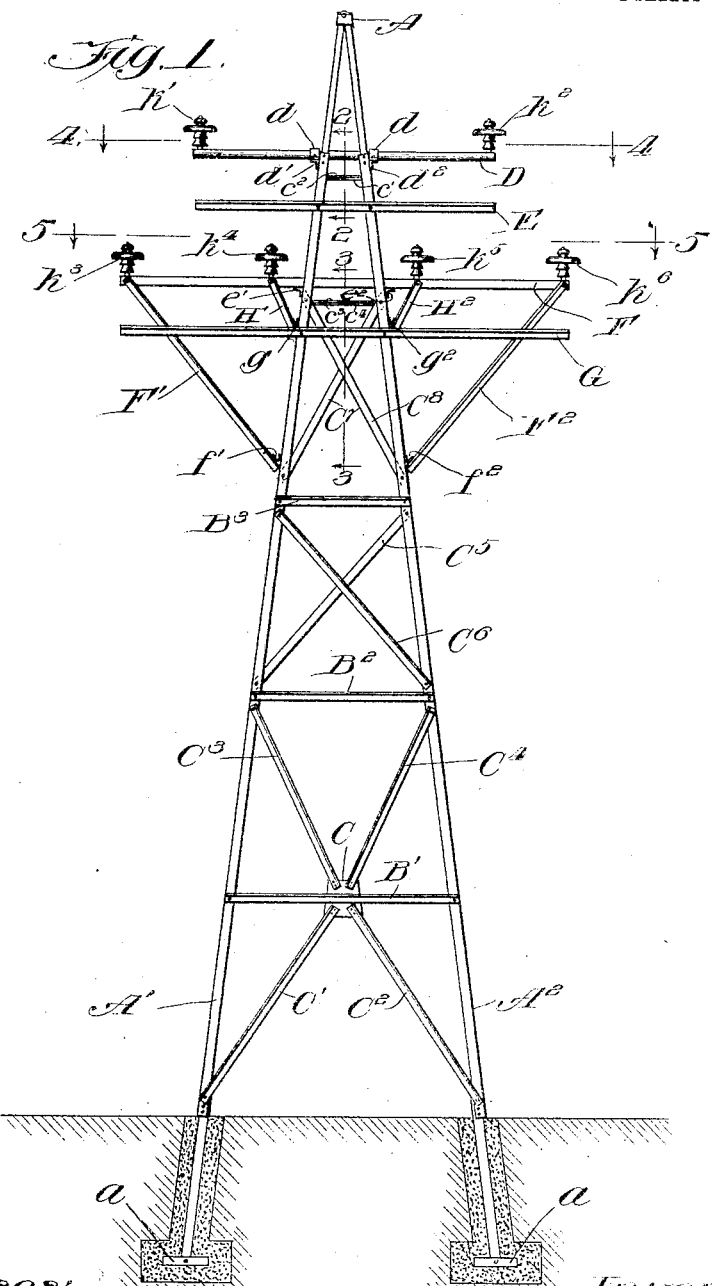

No. 840,947. PATENTED JAN. 8, 1907.
A. K. MANSFIELD.
TOWER FOR ELECTRIC TRANSMISSION CABLES.
APPLICATION FILED MAY 21, 1906.

2 SHEETS—SHEET 1.

Witnesses:
H. S. Gaidler
O. A. Mullen

Inventor:
Albert K. Mansfield
by Lamberton Wilkinson
his Attorneys

No. 840,947. PATENTED JAN. 8, 1907.
A. K. MANSFIELD.
TOWER FOR ELECTRIC TRANSMISSION CABLES.
APPLICATION FILED MAY 21, 1906.
2 SHEETS—SHEET 2.
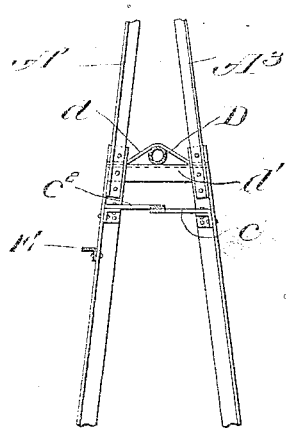
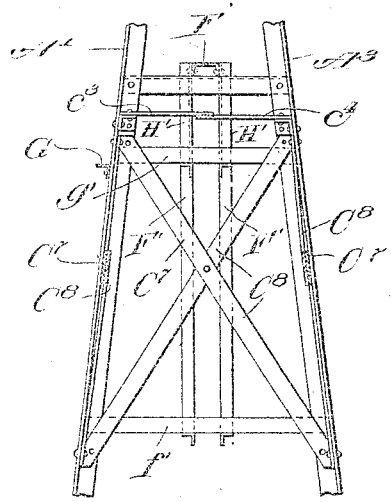
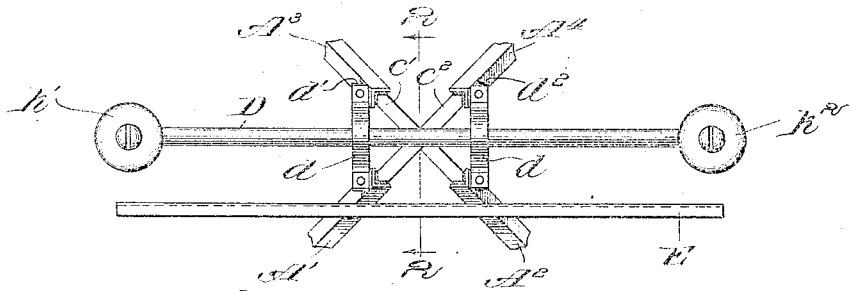
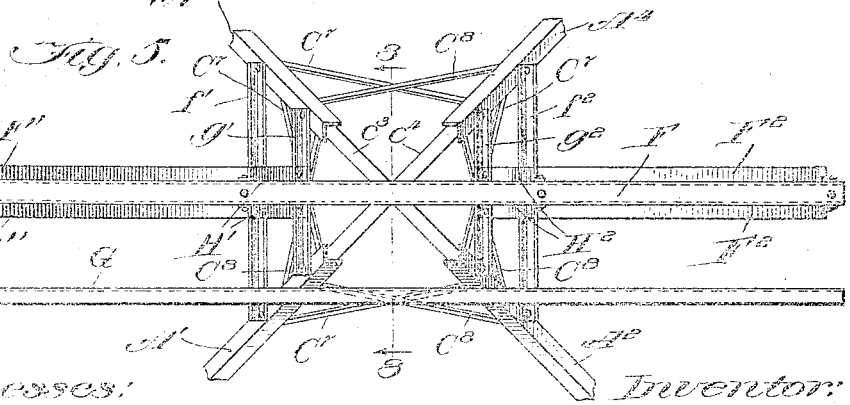
Witnesses:
H. S. Richter
C. A. Mullen
Inventor:
Albert K. Mansfield
by Chamberlin & Wilkinson
his Attorneys

UNITED STATES PATENT OFFICE.

ALBERT K. MANSFIELD, OF BATAVIA, ILLINOIS.

TOWER FOR ELECTRIC TRANSMISSION-CABLES.

No. 840,947.  Specification of Letters Patent.  Patented Jan. 8, 1907.

Application filed May 21, 1906. Serial No. 318,063.

*To all whom it may concern:*

Be it known that I, ALBERT K. MANSFIELD, a citizen of the United States, residing at Batavia, county of Kane, State of Illinois, have invented a certain new and useful Improvement in Towers for Electric Transmission-Cables; and I declare the following to be a full, clear, and exact description of the invention, such as will enable others skilled in the art to which it pertains to make and use the same, reference being had to the accompanying drawings, which form a part of this specification.

My invention relates in general to the transmission of electricity from a point where it is generated to a distant point of use, and more particularly to towers for supporting electrical transmission-cables.

At the present time in the transmission of electricity from a point of generation to a distant point of use it is customary to support the conducting-cables upon metallic poles or towers, having cross-arms thereon to which the cables are secured. It is desirable that the supporting poles or towers should be located as far apart as possible in order that a minimum number may be required. It is consequently necessary that the poles or towers should be of sufficient structural strength to sustain the weight of the cables and to withstand the tension of the lengths of cables between adjacent poles or towers. It frequently happens that cables break, which imposes upon the cross-arms, as well as upon the poles or towers at each side of the broken section, a severe torsional strain due to the weight and tension of the sections of cable at each side of the broken section.

The primary object of my invention is to provide a supporting-tower for electrical transmission-cables which will possess the requisite structural strength and will require a minimum amount of steel in its construction.

A further object of my invention is to provide a supporting-tower for electrical transmission-cables which will be so constructed as to afford a convenient footing for the workmen when securing the cables to the cross-arms.

A still further object of my invention is to provide a tower for supporting cables which will be simple in construction, inexpensive in manufacture, and durable in use.

The embodiment of my invention herein disclosed may be generally described as consisting of a pyramidal tower comprising four upwardly-converging columns, braces connecting the flanges of the alined pairs of columns, a tubular cross-arm supported upon the tower, a channel-bar cross-arm secured upon the tower, braces extending downwardly from the channel-bar cross-arm and secured to the tower, horizontal braces connecting the diagonally opposite columns of the tower located adjacent the cross-arms, and auxiliary cross-arms below said tubular and channel-bar cross-arms for affording a footing for workmen while securing the electrical cables to the tubular and channel-bar cross-arms.

The invention will be more fully described hereinafter with reference to the accompanying drawings, in which the same is illustrated as embodied in a convenient and practical form, and in which—

Figure 1 is an elevational view; Fig. 2, a detail sectional view on line 2 2, Fig. 1; Fig. 3, a detail sectional view on line 3 3, Fig. 1; Fig. 4, a horizontal sectional view on line 4 4, Fig. 1; and Fig. 5, a horizontal sectional view on line 5 5, Fig. 1.

The same reference characters are used to designate the same parts in the several figures of the drawings.

Reference characters $A'$, $A^2$, $A^3$, and $A^4$ designate upwardly-converging columns, the upper ends of which are united by a clamp A. The lower ends of the columns extend below the surface of the ground and are provided with base-plates $a$ for more securely anchoring the tower. The plates at the lower ends of the columns are preferably embedded in foundations of concrete. The columns are preferably formed of angle-bars and are rigidly united by means of braces secured to the alined flanges of adjacent columns.

Reference characters $C'$, $C^2$, $C^3$, and $C^4$ designate braces connected at their outer ends to the flanges of the columns $A'$ $A^2$ and united at their inner ends to a connecting-plate C.

$C^5$ and $C^6$ designate cross-braces uniting the alined flanges of the columns $A'$ $A^2$ immediately above the braces $C^3$ and $C^4$. $C^7$ and $C^8$ designate other crossed braces uniting the flanges of the columns $A'$ $A^2$ above the braces $C^5$ and $C^6$.

The braces may be formed of any desired cross-section and when formed of flat bars they are preferably united by rivets, as indicated in Fig. 3 at the points of their intersection. Braces such as above described are provided on each of the four sides of the pyramidal tower formed by the four converging columns.

The alined pairs of columns are also preferably united by horizontal girths B', B², and B³, riveted at their ends to the flanges of the columns. The girths may be made of any desired cross-section, preferably, however, of angle-bars.

D indicates a cross-arm supported upon the tower near the top thereof and formed of any desired cross-section. I have shown it in the drawings as tubular and as supporting at its outer ends insulators to which electrical cables are united. The cross-arm D is supported upon angle-bars $d'$ $d^2$, riveted at their ends to the columns. Straps $d$ extend over the portions of the tubular cross-arm above the angle-bars $d'$ $d^2$, and thereby securely retain the cross-arm upon the underlying angle-bars.

F designates a second cross-arm provided with four insulating-supports $k^3$, $k^4$, $k^5$, and $k^6$, to which cables are secured. The cross-arm F is preferably in the form of a channel-bar supported upon angle-bars $e'$ and $e^2$, rigidly secured to the columns of the tower. In order that the cross-arm F may have sufficient structural strength to withstand the torsional strain to which it is subjected when a cable breaks, braces are secured to the cross-arm and to the columns of the tower.

H' H² indicate braces, preferably angular in cross-section and connected at their upper ends to the cross-arm adjacent the tower and at their lower ends secured to angle-bars $g'$ $g^2$, riveted to the columns of the tower.

F' F² indicate braces extending downwardly from the outer ends of the cross-arm F to the tower, to which they are secured by angular bars $f'$ $f^2$, riveted to the flanges of the columns. The braces F' F² are also preferably angular in cross-section in order to withstand the strain imposed upon them when a cable breaks. The braces F' F² are arranged in pairs, the upper ends of each pair being connected to the side edges of the cross-arm F. It will be observed that a torsional strain imposed upon the cross-arm F by the breaking of a cable will be resisted by the tension of one brace in each pair and by the compression of the other brace in the pair. The capacity of the cross-arm to resist a torsional strain is consequently greatly increased by the pairs of braces.

In order that the torsional strain which is communicated to the tower from the cross-arms when a cable breaks may be distributed to all of the columns of the tower, horizontal braces are provided which unite diagonally opposite columns.

$c'$ $c^2$ indicate the diagonal braces adjacent the cross-arm D, while reference characters $c^3$ $c^4$ designate the diagonal braces which unite the columns adjacent the cross-arm F.

In order that the workmen when connecting or disconnecting the cables to or from the insulator, on the cross-arms may have a secure footing, I provide auxiliary cross-arms E and G. These cross-arms may conveniently be formed angular in section and may be riveted or bolted to the alined flanges of the columns at one side of the tower. The auxiliary cross-arms are located sufficient distances below the cross-arms which support the cables to permit a workman while standing thereon to conveniently reach the insulators.

From the foregoing description it will be observed that I have invented a tower for supporting electrical transmission-cables pyramidal in form, consequently possessing the greatest structural strength to resist the strains to which it is subjected and at the same time requiring a minimum amount of metal in its construction. It will be further observed that I have invented a supporting structure for cables in which the cross-arms to which the cables are secured are so braced as to sustain the torsional strain incident to the breaking of the cable. It will be further observed that in my improved tower a convenient and safe footing is provided for workmen while engaged in securing or disconnecting cables to and from the cross-arms.

Having now fully described my invention, what I claim as new, and desire to secure by Letters Patent, is—

1. The combination with a pyramidal tower for supporting electrical transmission-cables comprising four angle-iron columns, of a plurality of cross-arms rigidly secured intermediate of their ends to said tower, means mounted upon said cross-arms for securing cables thereto, horizontal braces rigidly uniting alined flanges of said columns, inclined girths intermediate of said horizontal braces and rigidly uniting adjacent columns, and braces uniting diagonally opposite columns of said tower adjacent said cross-arms.

2. In a supporting structure for electrical transmission-cables, the combination with a tower comprising four or more angle-iron columns, of a cross-arm rigidly secured intermediate of its ends to said tower, braces uniting diagonally opposite columns of said tower adjacent said cross-arm, and means for securing electrical transmission-cables to said cross-arm.

3. In a supporting structure for electrical transmission-cables, the combination with four or more converging angle-iron columns forming a pyramidal tower, of braces connecting the alined flanges of said columns, horizontal braces uniting diagonally opposite columns, and a cross-arm secured intermediate of its ends to said tower adjacent said diagonal braces.

4. The combination with a supporting structure for electrical transmission-cables comprising a plurality of rigidly-united columns, of a cross-arm secured intermediate of its ends to said structure, means mounted upon said cross-arm for securing cables thereto, and an auxiliary cross-arm secured to and rigidly uniting the columns of said supporting structure to afford a footing for workmen while securing cables to said first cross-arm.

5. The combination with a supporting structure for electrical transmission-cables comprising a plurality of rigidly-united angle-iron columns, of a plurality of cross-arms secured intermediate of their ends to said structure, means mounted upon said cross-arms for securing cables thereto, and auxiliary cross-arms secured to and rigidly uniting the columns of said structure below said first-mentioned cross-arm to afford supports for workmen while securing cables to the structure.

6. In a supporting structure for electrical transmission-cables, the combination with a channel-bar cross-arm rigidly secured intermediate of its ends to said structure, means mounted upon said cross-arm for securing cables thereto, and a pair of torsion-braces interposed between said supporting structure, and each of the laterally-projecting portions of said cross-arm, whereby torsional strain imposed on the cross-arm will be resisted by the tension on one and the compression on the other of said pair of braces.

7. In a supporting structure for electrical transmission-cables, the combination with a plurality of columns, means for rigidly connecting said columns to form a tower, a cross-arm composed of rigidly-united angle-bars secured intermediate of its ends to said tower, means mounted upon said cross-arm for securing cables thereto and a pair of torsion-braces interposed between the columns composing said tower, and each laterally-projecting portion of said cross-arm, whereby torsional strain imposed on the cross-arm will be resisted by the tension on one and the compression on the other of said pair of braces.

In testimony whereof I sign this specification in the presence of two witnesses.

ALBERT K. MANSFIELD.

Witnesses:
GEO. L. WILKINSON,
BERTHA NATHANSON.